(12) United States Patent
Kawakami et al.

(10) Patent No.: US 11,446,742 B2
(45) Date of Patent: Sep. 20, 2022

(54) CUTTING INSERT FOR DRILL, AND DRILL

(71) Applicant: SUMITOMO ELECTRIC HARDMETAL CORP., Hyogo (JP)

(72) Inventors: Yuma Kawakami, Hyogo (JP); Tomoyuki Fukuyama, Hyogo (JP); Shinya Ikenaga, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 175 days.

(21) Appl. No.: 17/052,863

(22) PCT Filed: Mar. 26, 2019

(86) PCT No.: PCT/JP2019/012868
§ 371 (c)(1),
(2) Date: Nov. 4, 2020

(87) PCT Pub. No.: WO2019/220778
PCT Pub. Date: Nov. 21, 2019

(65) Prior Publication Data
US 2021/0237166 A1 Aug. 5, 2021

(30) Foreign Application Priority Data
May 16, 2018 (JP) .............................. JP2018-094621

(51) Int. Cl.
B23B 27/16 (2006.01)
B23B 27/14 (2006.01)
B23B 51/00 (2006.01)

(52) U.S. Cl.
CPC ............ *B23B 27/141* (2013.01); *B23B 51/00* (2013.01); *B23B 2200/0447* (2013.01); *B23B 2200/087* (2013.01)

(58) Field of Classification Search
CPC ........ B23B 2200/325; B23B 2200/323; B23B 2200/32; B23B 2200/087;
(Continued)

(56) References Cited
U.S. PATENT DOCUMENTS 5,758,994 A * 6/1998 Hintze ................. B23B 27/141
407/115
6,039,515 A 3/2000 Lamberg
(Continued)

FOREIGN PATENT DOCUMENTS

DE 102009032967 A 1/2011
EP 2439009 A1 4/2012
(Continued)

*Primary Examiner* — Alan Snyder
(74) *Attorney, Agent, or Firm* — Renner, Otto, Boisselle & Sklar LLP

(57) ABSTRACT

When seen in a direction perpendicular to a seating surface, the second boundary line has a first portion and a second portion, the first portion having an inclination relative to the second cutting edge portion in a counter clockwise direction, the first portion being located between the first boundary line and an intersection between the second boundary line and a straight line passing through a center of a mounting hole and perpendicular to the second cutting edge portion, the second portion being located opposite to the first portion relative to the intersection, the second portion having an inclination relative to the second cutting edge portion in a clockwise direction.

8 Claims, 12 Drawing Sheets

(58) Field of Classification Search
CPC ...... B23B 2200/086; B23B 2200/0447; B23B 2251/48; B23B 51/0008; B23B 27/143; B23B 27/1607; B23B 27/1618
See application file for complete search history.

(56) References Cited

U.S. PATENT DOCUMENTS

2008/0219791 A1   9/2008  Nasu
2011/0164936 A1   7/2011  Okumura

FOREIGN PATENT DOCUMENTS

| | | |
|---|---|---|
| JP | 10-263905 A | 10/1998 |
| JP | 10-315023 A | 12/1998 |
| JP | 2001-239412 A | 9/2001 |
| JP | 2003-062712 A | 3/2003 |
| JP | 2008-213124 A | 9/2008 |
| WO | 2009/001973 A1 | 12/2008 |
| WO | 2009/084315 A1 | 7/2009 |
| WO | 2015/036990 A1 | 3/2015 |

\* cited by examiner

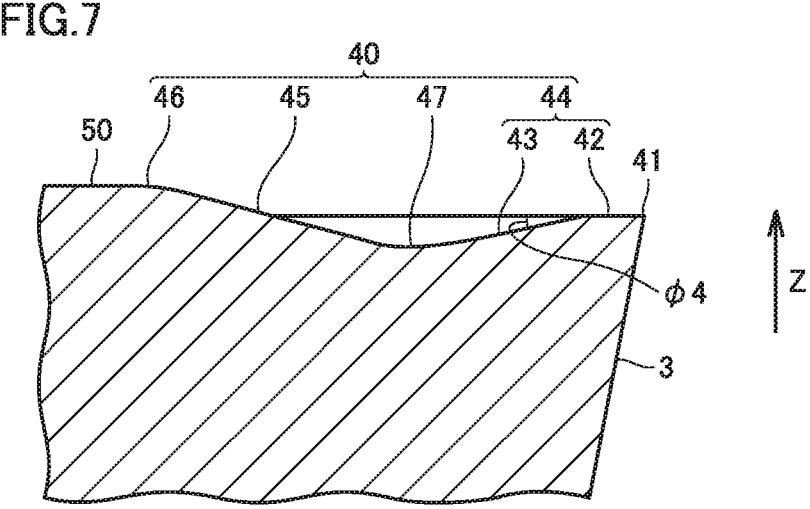
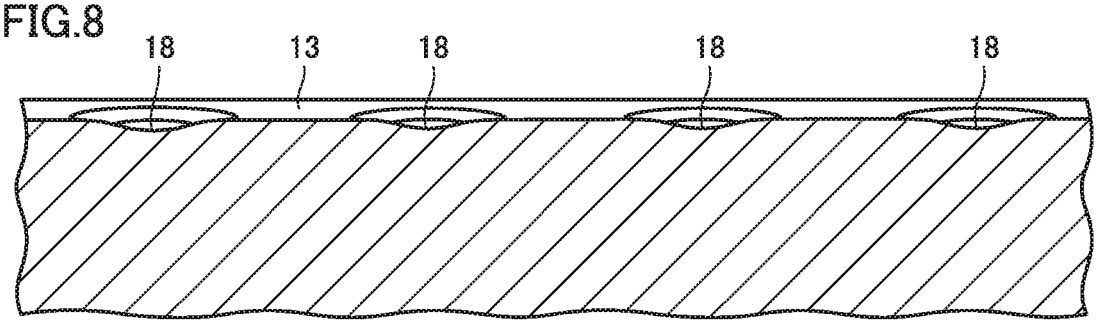

CUTTING INSERT FOR DRILL, AND DRILL

TECHNICAL FIELD

The present disclosure relates to a cutting insert for drill, and a drill. The present application claims a priority based on Japanese Patent Application No. 2018-094621 filed on May 16, 2018, the entire content of which is incorporated herein by reference.

BACKGROUND ART

Japanese Patent Laying-Open No. 2008-213124 (PTL 1) discloses a throwaway insert for drill. On an upper surface of the throwaway insert, a chip breaker is provided along a cutting edge.

CITATION LIST

Patent Literature

PTL 1: Japanese Patent Laying-Open No. 2008-213124

SUMMARY OF INVENTION

A cutting insert for drill according to one embodiment of the present disclosure includes a top surface, a seating surface, and an outer circumferential surface, and is provided with a mounting hole. The seating surface is located opposite to the top surface. The outer circumferential surface is continuous to each of the top surface and the seating surface. The mounting hole extends from the top surface to the seating surface. A ridgeline between the top surface and the outer circumferential surface constitutes a cutting edge. When seen in a direction perpendicular to the seating surface, the cutting edge has a parallelogram shape having a first cutting edge portion, a second cutting edge portion, a third cutting edge portion, and a fourth cutting edge portion. The first cutting edge portion faces the third cutting edge portion. An angle between the third cutting edge portion and the second cutting edge portion is smaller than 90°. The second cutting edge portion faces the fourth cutting edge portion. A length of the second cutting edge portion is larger than a length of first cutting edge portion 11. The top surface is provided with: a first rake face continuous to the first cutting edge portion; a first side surface continuous to the first rake face; a second rake face continuous to the second cutting edge portion; a second side surface continuous to the second rake face; a flat surface portion continuous to both the first side surface and the second side surface; a first groove constituted of the first rake face and the first side surface; a second groove constituted of the second rake face and the second side surface; a first boundary line that is a ridgeline between the first side surface and the flat surface portion and that has a straight line shape; and a second boundary line that is a ridgeline between the second side surface and the flat surface portion. When seen in the direction perpendicular to the seating surface, the second boundary line has a first portion and a second portion, the first portion having an inclination relative to the second cutting edge portion in a counter clockwise direction, the first portion being located between the first boundary line and an intersection between the second boundary line and a straight line passing through a center of the mounting hole and perpendicular to the second cutting edge portion, the second portion being located opposite to the first portion relative to the intersection, the second portion having an inclination relative to the second cutting edge portion in a clockwise direction.

A cutting insert for drill according to one embodiment of the present disclosure includes a top surface, a seating surface, and an outer circumferential surface, and is provided with a mounting hole. The seating surface is located opposite to the top surface. The outer circumferential surface is continuous to each of the top surface and the seating surface. The mounting hole extends from the top surface to the seating surface. A ridgeline between the top surface and the outer circumferential surface constitutes a cutting edge. When seen in a direction perpendicular to the seating surface, the cutting edge has a parallelogram shape having a first cutting edge portion, a second cutting edge portion, a third cutting edge portion, and a fourth cutting edge portion. The first cutting edge portion faces the third cutting edge portion. An angle between the third cutting edge portion and the second cutting edge portion is smaller than 90°. The second cutting edge portion faces the fourth cutting edge portion. A length of the second cutting edge portion is larger than a length of the first cutting edge portion. The top surface is provided with: a first rake face continuous to the first cutting edge portion; a first side surface continuous to the first rake face; a second rake face continuous to the second cutting edge portion; a second side surface continuous to the second rake face; a third rake face continuous to the third cutting edge portion; a third side surface continuous to the third rake face; a flat surface portion continuous to the first side surface, the second side surface, and the third side surface; a first groove constituted of the first rake face and the first side surface; a second groove constituted of the second rake face and the second side surface; a third groove constituted of the third rake face and the third side surface; a first boundary line that is a ridgeline between the first side surface and the flat surface portion and that has a straight line shape; a second boundary line that is a ridgeline between the second side surface and the flat surface portion; and a third boundary line that is a ridgeline between the third side surface and the flat surface portion and that has a straight line shape. The second boundary line has a first portion, a second portion, a third portion, and a fourth portion. The first portion is located between the first boundary line and an intersection between the second boundary line and a straight line passing through a center of the mounting hole and perpendicular to the second cutting edge portion. The second portion is located opposite to the first portion relative to the intersection. The third portion is continuous to the second portion between the second portion and the third boundary line. The fourth portion is continuous to the first portion between the first portion and the first boundary line. When seen in the direction perpendicular to the seating surface, each of the first portion and the third portion has an inclination relative to the second cutting edge portion in a counter clockwise direction. When seen in the direction perpendicular to the seating surface, each of the second portion and the fourth portion has an inclination relative to the second cutting edge portion in a clockwise direction. When seen in the direction perpendicular to the seating surface, a connection portion between the third boundary line and the third portion is located between the third cutting edge portion and a bisector of the angle between the second cutting edge portion and the third cutting edge portion. When seen in the direction perpendicular to the seating surface, a distance between the connection portion and the second cutting edge portion is longer than a distance between the intersection and the second cutting edge portion in a direction parallel to the straight line. A rake angle of the second rake face in a cross section perpendicular to the second cutting edge portion is larger than a rake angle of the first rake face in a cross section perpendicular to the first cutting edge portion. When seen in the direction perpendicular to the seating surface, the second boundary line has a portion extending along a concentric circle of the mounting hole. The first boundary line is parallel to the first cutting edge portion. Each of the third portion and the fourth portion has a straight line shape.

BRIEF DESCRIPTION OF DRAWINGS

FIG. 7 is a schematic cross sectional view taken along a VII-VII line of FIG. 2.

FIG. 8 is a schematic cross sectional view taken along a VIII-VIII line of FIG. 2.

DETAILED DESCRIPTION

Figure 1:
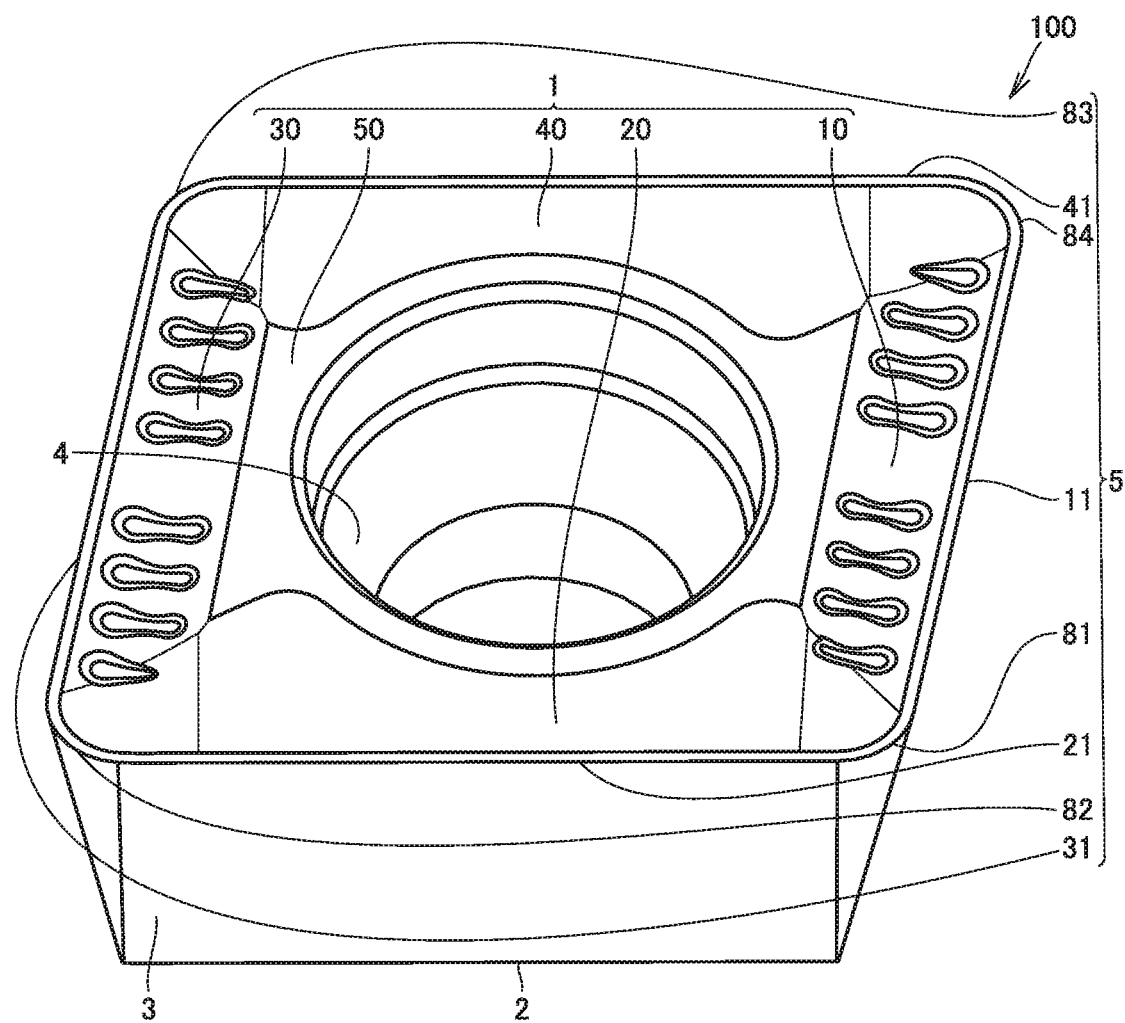
FIG. 1 is a schematic perspective view showing a configuration of a cutting insert for drill according to a first embodiment.

Problem to be Solved by the Present Disclosure

When drilling is performed using the throwaway insert described in Japanese Patent Laying-Open No. 2008-213124, swarf may be brought into abutment with a side wall surface of the drilled hole to form a scratch on the side wall surface, with the result that quality of the side wall surface of the hole may be deteriorated.

An object of one embodiment of the present disclosure is to provide a cutting insert for drill and a drill, by each of which deterioration of quality of a side wall surface of a hole can be suppressed.

Advantageous Effect of the Present Disclosure

According to one embodiment of the present disclosure, there can be provided a cutting insert for drill and a drill, by each of which deterioration of quality of a side wall surface of a hole can be suppressed.

Summary of Embodiment of the Present Disclosure

First, the following describes a summary of an embodiment of the present disclosure.

(1) A cutting insert 100 for drill according to one embodiment of the present disclosure includes a top surface 1, a seating surface 2, and an outer circumferential surface 3, and is provided with a mounting hole 4. Seating surface 2 is located opposite to top surface 1. Outer circumferential surface 3 is continuous to each of top surface 1 and seating surface 2. Mounting hole 4 extends from top surface 1 to seating surface 2. A ridgeline between top surface 1 and outer circumferential surface 3 constitutes a cutting edge 5. When seen in a direction perpendicular to seating surface 2, cutting edge 5 has a parallelogram shape having a first cutting edge portion 11, a second cutting edge portion 21, a third cutting edge portion 31, and a fourth cutting edge portion 41. First cutting edge portion 11 faces third cutting edge portion 31. An angle θ2 between third cutting edge portion 31 and second cutting edge portion 21 is smaller than 90°. Second cutting edge portion 21 faces fourth cutting edge portion 41. A length W2 of second cutting edge portion 21 is larger than a length W1 of first cutting edge portion 11. Top surface 1 is provided with: a first rake face 14 continuous to first cutting edge portion 11; a first side surface 15 continuous to first rake face 14; a second rake face 24 continuous to second cutting edge portion 21; a second side surface 25 continuous to second rake face 24; a flat surface portion 50 continuous to both first side surface 15 and second side surface 25; a first groove 10 constituted of first rake face 14 and first side surface 15; a second groove 20 constituted of second rake face 24 and second side surface 25; a first boundary line 16 that is a ridgeline between first side surface 15 and flat surface portion 50 and that has a straight line shape; and a second boundary line 26 that is a ridgeline between second side surface 25 and flat surface portion 50. When seen in the direction perpendicular to seating surface 2, second boundary line 26 has a first portion 61 and a second portion 62, first portion 61 having an inclination relative to second cutting edge portion 21 in a counter clockwise direction, first portion 61 being located between first boundary line 16 and an intersection between second boundary line 26 and a straight line passing through a center of mounting hole 4 and perpendicular to second cutting edge portion 21, second portion 62 being located opposite to first portion 61 relative to the intersection, second portion 62 having an inclination relative to second cutting edge portion 21 in a clockwise direction.

In cutting insert 100 for drill according to (1), second boundary line 26 has first portion 61 having an inclination relative to second cutting edge portion 21 in the counter clockwise direction. This results in a longer distance until swarf cut by second cutting edge portion 21 hits second boundary line 26, as compared with a case where second boundary line 26 extends in parallel with second cutting edge portion 21. Even when second cutting edge portion 21 is used for the inner circumference side of the drill on which cutting speed is relatively slow, second side surface 25 does not prevent swarf from flowing out therefrom. Accordingly, swarf can be suppressed from being brought into abutment with a side wall surface of a hole formed in a workpiece to form a scratch on the side wall surface. Hence, quality of the side wall surface of the hole can be suppressed from being deteriorated.

(2) In cutting insert 100 for drill according to (1), top surface 1 may be provided with: a third rake face 34 continuous to third cutting edge portion 31; a third side surface 35 continuous to both third rake face 34 and flat surface portion 50; a third groove 30 constituted of third rake face 34 and third side surface 35; and a third boundary line 36 that is a ridgeline between third side surface 35 and flat surface portion 50 and that has a straight line shape. Second boundary line 26 may have a third portion 63 continuous to second portion 62 between second portion 62 and third boundary line 36. When seen in the direction perpendicular to seating surface 2, third portion 63 may have an inclination relative to second cutting edge portion 21 in the counter clockwise direction. When such a third portion 63 is used as a cutting edge on the outer circumferential side of the drill on which relative cutting speed is high, swarf can be rounded effectively. Hence, quality of the side wall surface of the hole can be further suppressed from being deteriorated.

(3) in cutting insert 100 for drill according to (2), when seen in the direction perpendicular to seating surface 2, a connection portion C between third portion 63 and third boundary line 36 may be located between third cutting edge portion 31 and a bisector L6 of the angle between second cutting edge portion 21 and third cutting edge portion 31.

(4) In cutting insert 100 for drill according to (3), when seen in the direction perpendicular to seating surface 2, a distance D2 between connection portion C and second cutting edge portion 21 may be longer than a distance 1 between intersection B and second cutting edge portion 21 in a direction parallel to third straight line L3.

(5) In cutting insert 100 for drill according to any one of (1) to (4), second boundary line 26 may have a fourth portion 64 continuous to first portion 61 between first portion 61 and first boundary line 16. When seen in the direction perpendicular to seating surface 2, fourth portion 64 may have an inclination relative to second cutting edge portion 21 in the clockwise direction. Hence, quality of the side wall surface of the hole can be further suppressed from being deteriorated.

(6) In cutting insert 100 for drill according to any one of (1) to (5), a rake angle φ2 of second rake face 24 in a cross section perpendicular to second cutting edge portion 21 may be larger than a rake angle 1 of first rake face 14 in a cross section perpendicular to first cutting edge portion 11.

(7) In cutting insert 100 for drill according to any one of (1) to (6), first rake face 14 may have a first flat portion 12 continuous to first cutting edge portion 11, and a first inclined surface portion 13 continuous to first flat portion 12. First inclined surface portion 13 may be provided with a plurality of groove portions 18 disposed along a direction parallel to first cutting edge portion 11 with a space being interposed between the plurality of groove portions 18.

(8) A cutting insert 100 for drill according to one embodiment of the present disclosure includes a top surface 1, a seating surface 2, and an outer circumferential surface 3, and is provided with a mounting hole 4. Seating surface 2 is located opposite to top surface 1. Outer circumferential surface 3 is continuous to each of top surface 1 and seating surface 2. Mounting hole 4 extends from top surface 1 to seating surface 2. A ridgeline between top surface 1 and outer circumferential surface 3 constitutes a cutting edge 5. When seen in a direction perpendicular to seating surface 2, cutting edge 5 has a parallelogram shape having a first cutting edge portion 11, a second cutting edge portion 21, a third cutting edge portion 31, and a fourth cutting edge portion 41. First cutting edge portion 11 faces third cutting edge portion 31. An angle θ2 between third cutting edge portion 31 and second cutting edge portion 21 is smaller than 90°, Second cutting edge portion 21 faces fourth cutting edge portion 41. A length W2 of second cutting edge portion 21 is larger than a length W1 of first cutting edge portion 11. Top surface 1 is provided with: a first rake face 14 continuous to first cutting edge portion 11; a first side surface 15 continuous to first rake face 14; a second rake face 24 continuous to second cutting edge portion 21; a second side surface 25 continuous to second rake face 24; a third rake face 34 continuous to third cutting edge portion 31; a third side surface 35 continuous to third rake face 34; a flat surface portion 50 continuous to first side surface 15, second side surface 25, and third side surface 35; a first groove 10 constituted of first rake face 14 and first side surface 15; a second groove 20 constituted of second rake face 24 and second side surface 25; a third groove 30 constituted of third rake face 34 and third side surface 35; a first boundary line 16 that is a ridgeline between first side surface 15 and flat surface portion 50 and that has a straight line shape; a second boundary line 26 that is a ridgeline between second side surface 25 and flat surface portion 50; and a third boundary line 36 that is a ridgeline between third side surface 35 and flat surface portion 50 and that has a straight line shape. Second boundary line 26 has a first portion 61, a second portion 62, a third portion 63, and a fourth portion 64. First portion 61 is located between first boundary line 16 and an intersection B between second boundary line 26 and a straight line L3 passing through a center A of mounting hole 4 and perpendicular to second cutting edge portion 21. Second portion 62 is located opposite to first portion 61 relative to intersection B. Third portion 63 is continuous to second portion 62 between second portion 62 and third boundary line 36. Fourth portion 64 is continuous to first portion 61 between first portion 61 and first boundary line 16. When seen in the direction perpendicular to seating surface 2, each of first portion 61 and third portion 63 has an inclination relative to second cutting edge portion 21 in a counter clockwise direction. When seen in the direction perpendicular to seating surface 2, each of second portion 62 and fourth portion 64 has an inclination relative to second cutting edge portion 21 in a clockwise direction. When seen in the direction perpendicular to seating surface 2, a connection portion C between third boundary line 36 and third portion 63 is located between third cutting edge portion 31 and a bisector L6 of the angle between second cutting edge portion 21 and third cutting edge portion 31. When seen in the direction perpendicular to seating surface 2, a distance D2 between connection portion C and second cutting edge portion 21 is longer than a distance D1 between intersection B and second cutting edge portion 21 in a direction parallel to straight line L3. A rake angle φ2 of second rake face 24 in a cross section perpendicular to second cutting edge portion 21 is larger than a rake angle φ1 of first rake face 14 in a cross section perpendicular to first cutting edge portion 11. When seen in the direction perpendicular to seating surface 2, second boundary line 26 has a portion extending along a concentric circle of mounting hole 4: First boundary line 16 is parallel to first cutting edge portion 11. Each of third portion 63 and fourth portion 64 has a straight line shape.

(9) A drill according to one embodiment of the present disclosure includes: cutting insert 100 for drill according to any one of (1) to (8); and a holder 70 that supports cutting insert 100 for drill. First cutting edge portion 11 is an outer edge and second cutting edge portion 21 is an inner edge.

Details of Embodiments of the Present Disclosure

The following describes details of the embodiment of the present disclosure with reference to figures. It should be noted that in the below-described figures, the same or corresponding portions are given the same reference characters and are not described repeatedly.

First Embodiment

First, a configuration of a cutting insert 100 for drill according to a first embodiment will be described.

FIG. 1 is a schematic perspective view showing the configuration of the cutting insert for drill according to the first embodiment. As shown in FIG. 1, cutting insert 100 for drill according to the first embodiment has a top surface 1, a seating surface 2, and an outer circumferential surface 3, and is provided with a mounting hole 4. Seating surface 2 is a surface to be installed on a holder 70 (see FIG. 14). Seating surface 2 is located opposite to top surface 1. Outer circumferential surface 3 is continuous to each of top surface 1 and seating surface 2. Outer circumferential surface 3 surrounds the outer circumference of each of top surface 1 and seating surface 2. Cutting insert 100 for drill is provided with mounting hole 4 extending from top surface 1 to seating surface 2. Mounting hole 4 is surrounded by outer circumferential surface 3. A ridgeline between top surface 1 and outer circumferential surface 3 constitutes cutting edge 5. Cutting edge 5 has a first cutting edge portion 11, a second cutting edge portion 21, a third cutting edge portion 31, a fourth cutting edge portion 41, a first corner edge portion 81, a second corner edge portion 82, a third corner edge portion 83, and a fourth corner edge portion 84. Top surface 1 is provided with a first groove 10, a second groove 20, a third groove 30, and a fourth groove 40.

Figure 2:
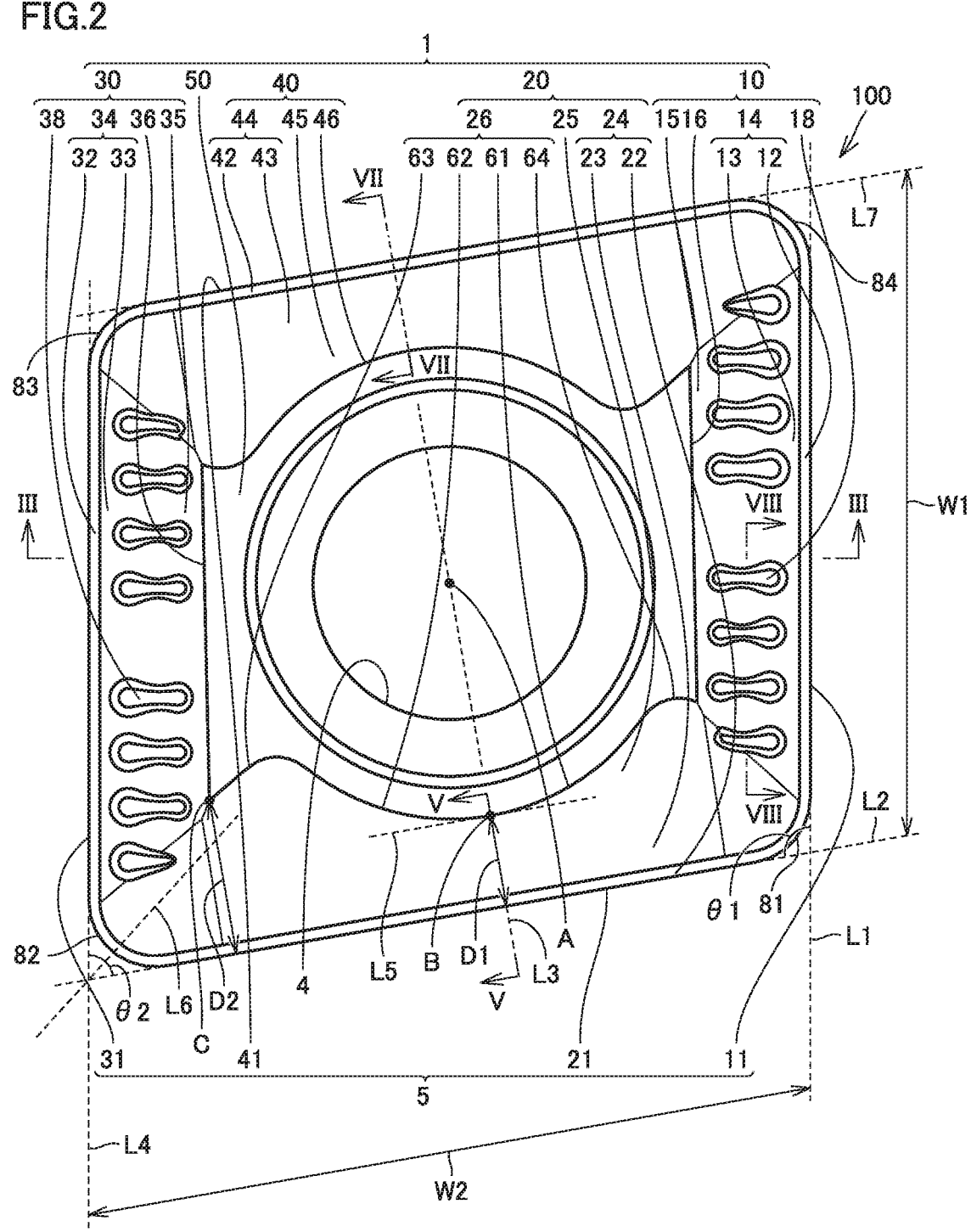
FIG. 2 is a schematic plan view showing the configuration of the cutting insert for drill according to the first embodiment.

FIG. 2 is a schematic plan view showing the configuration of the cutting insert for drill according to the first embodiment. As shown in FIG. 2, when seen in the direction perpendicular to seating surface 2, each of first cutting edge portion 11, second cutting edge portion 21, third cutting edge portion 31, and fourth cutting edge portion 41 has a straight line shape, for example. First cutting edge portion 11 extends along a first straight line Second cutting edge portion 21 extends along a second straight line L2. Second straight line L2 crosses first straight line L1. An angle θ1 between first cutting edge portion 11 extending along first straight line L1 and second cutting edge portion 21 extending along second straight line L2 is more than 90° and less than 180°. Length W2 of second cutting edge portion 21 is larger than length W1 of first cutting edge portion 11. Third cutting edge portion 31 is located opposite to first cutting edge portion 11. Third cutting edge portion 31 extends along a fourth straight line L4 parallel to first straight line L1. An angle θ2 between second cutting edge portion 21 extending along second straight line L2 and third cutting edge portion 31 extending along fourth straight line L4 is more than 0° and less than 90°. Fourth cutting edge portion 41 is located opposite to second cutting edge portion 21. Fourth cutting edge portion 41 extends along a seventh straight line L7 parallel to second straight line L2. As shown in FIG. 2, mounting hole 4 is located between first cutting edge portion 11 and third cutting edge portion 31. Similarly, mounting hole 4 is located between second cutting edge portion 21 and fourth cutting edge portion 41. First cutting edge portion 11 faces third cutting edge portion 31, Second cutting edge portion 21 faces fourth cutting edge portion 41.

As shown in FIG. 2, when seen in the direction perpendicular to seating surface 2, each of first corner edge portion 81, second corner edge portion 82, third corner edge portion 83, and fourth corner edge portion 84 has a shape of arc, for example. First corner edge portion 81 is continuous to each of first cutting edge portion 11 and second cutting edge portion 21. Second corner edge portion 82 is continuous to each of second cutting edge portion 21 and third cutting edge portion 31. Third corner edge portion 83 is continuous to each of third cutting edge portion 31 and fourth cutting edge portion 41. Fourth corner edge portion 84 is continuous to each of fourth cutting edge portion 41 and first cutting edge portion 11. As shown in FIG. 2, when seen in the direction perpendicular to seating surface 2, cutting edge 5 has a parallelogram shape. The expression "cutting edge 5 has a parallelogram shape" indicates that cutting edge 5 has portions extending along the respective sides of the parallelogram, and the corner portions of cutting edge 5 may be round. As shown in FIG. 2, a region surrounded by first straight line L1, second straight line L2, fourth straight line L4, and seventh straight line L7 is a parallelogram.

First groove 10 is constituted of a first rake face 14 and a first side surface 15, for example. First rake face 14 has a portion inclined relative to a flat surface 50 to have a height that becomes lower toward mounting hole 4. On the other hand, first side surface 15 is inclined relative to flat surface 50 to have a height that becomes higher toward mounting hole 4. First rake face 14 is continuous to first cutting edge portion 11. First side surface 15 is continuous to first rake face 14. First rake face 14 has a first flat portion 12 and a first inclined surface portion 13, for example. First flat portion 12 is continuous to first cutting edge portion 11. First inclined surface portion 13 is continuous to first flat portion 12. First side surface 15 may be parallel to first cutting edge portion 11. Second groove 20 is constituted of a second rake face 24 and a second side surface 25, for example. Second rake face 24 has a portion inclined relative to flat surface 50 to have a height that becomes lower toward mounting hole 4. On the other hand, second side surface 25 is inclined relative to flat surface 50 to have a height that becomes higher toward mounting hole 4. Second rake face 24 is continuous to second cutting edge portion 21. Second side surface 25 is continuous to second rake face 24. Second rake face 24 has a second flat portion 22 and a second inclined surface portion 23, for example. Second flat portion 22 is continuous to second cutting edge portion 21. Second inclined surface portion 23 is continuous to second flat portion 22.

Similarly, third groove 30 is constituted of a third rake face 34 and a third side surface 35, for example. Third rake face 34 has a portion inclined relative to flat surface 50 to have a height that becomes lower toward mounting hole 4. On the other hand, third side surface 35 is inclined relative to flat surface 50 to have a height that becomes higher toward mounting hole 4. Third rake face 34 is continuous to third cutting edge portion 31. Third side surface 35 is continuous to third rake face 34. Third rake face 34 has a third flat portion 32 and a third inclined surface portion 33, for example. Third flat portion 32 is continuous to third cutting edge portion 31. Third inclined surface portion 33 is continuous to third flat portion 32. Third side surface 35 may be parallel to third cutting edge portion 31. Fourth groove 40 is constituted of a fourth rake face 44 and a fourth side surface 45, for example. Fourth rake face 44 has a portion inclined relative to flat surface 50 to have a height that becomes lower toward mounting hole 4. On the other hand, fourth side surface 45 is inclined relative to flat surface 50 to have a height that becomes higher toward mounting hole 4. Fourth rake face 44 is continuous to fourth cutting edge portion 41. Fourth side surface 45 is continuous to fourth rake face 44. Fourth rake face 44 has a fourth flat portion 42 and a fourth inclined surface portion 43, for example. Fourth flat portion 42 is continuous to fourth cutting edge portion 41. Fourth inclined surface portion 43 is continuous to fourth flat portion 42.

As shown in FIG. 2, top surface 1 has flat surface portion 50. Flat surface portion 50 is continuous to first side surface 15, second side surface 25, third side surface 35, and fourth side surface 45. Flat surface portion 50 is located between first side surface 15 and third side surface 35. Flat surface portion 50 is located between second side surface 25 and fourth side surface 45. When seen in the direction perpendicular to seating surface 2, flat surface portion 50 surrounds mounting hole 4.

Figure 3:
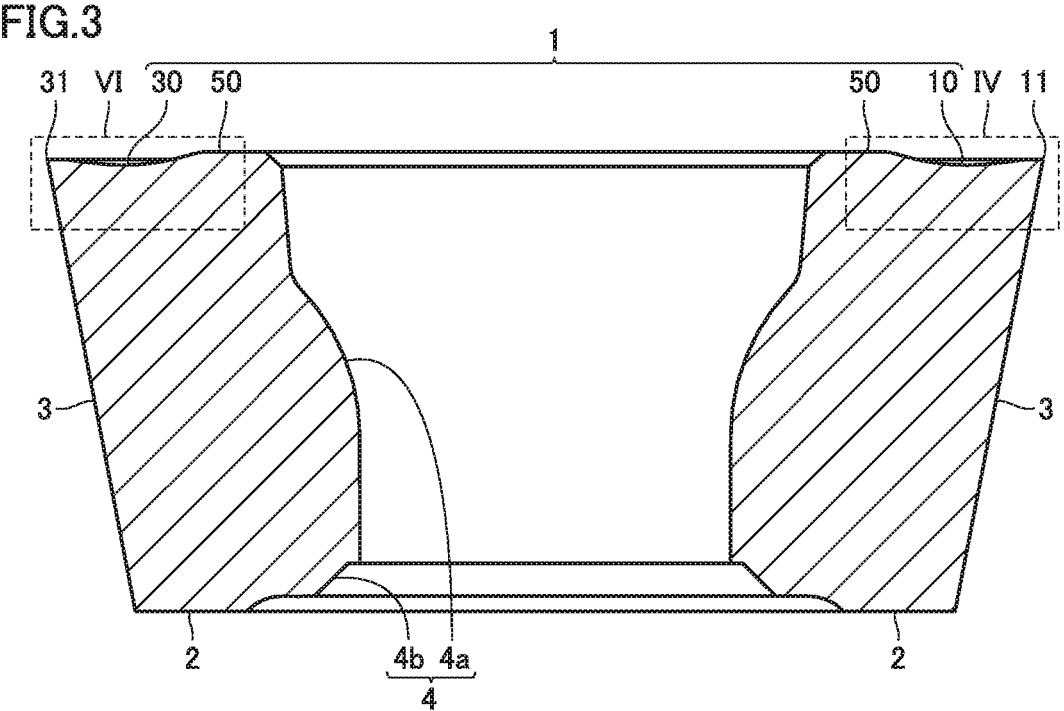
FIG. 3 is a schematic cross sectional view taken along a line III-III of FIG. 2.

FIG. 3 is a schematic cross sectional view taken along a line III-III of FIG. 2. As shown in FIG. 3, in a cross section perpendicular to first straight line L1, outer circumferential surface 3 has a taper shape, for example. For example, outer circumferential surface 3 is inclined to have a width that becomes smaller from top surface 1 toward seating surface 2. Mounting hole 4 opens in each of top surface 1 and seating surface 2. Mounting hole 4 is a through hole. Mounting hole 4 may have: a first hole portion 4a at which the width of mounting hole 4 becomes smaller from top surface 1 toward seating surface 2; and a second hole portion 4b at which the width of mounting hole 4 becomes larger from top surface 1 toward seating surface 2.

Figure 4:
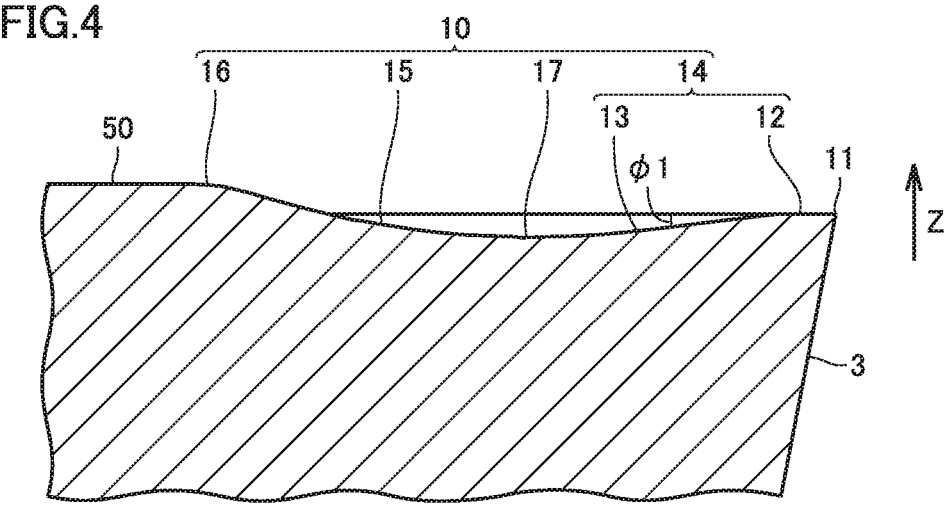
FIG. 4 is an enlarged view of a region IV of FIG. 3.

FIG. 4 is an enlarged view of a region IV of FIG. 3. As shown in FIG. 4, first inclined surface portion 13 and first side surface 15 may constitute first groove 10 in a cross section perpendicular to first cutting edge portion 11 (first straight line L1). First inclined surface portion 13 is inclined toward the seating surface 2 side relative to first flat portion 12, for example. First inclined surface portion 13 has a first rake angle $\phi1$ of more than or equal to 0° and less than or equal to 15°, for example. First rake angle $\phi1$ may be an inclination angle of first inclined surface portion 13 relative to a plane parallel to seating surface 2. In first groove 10, a first bottom portion 17 is a portion having the lowest height in the direction perpendicular to seating surface 2. First side surface 15 rises from first bottom portion 17 of first groove 10 toward flat surface portion 50. First side surface 15 is inclined toward the seating surface 2 side relative to flat surface portion 50. In direction Z perpendicular to seating surface 2, first cutting edge portion 11 is located between first bottom portion 17 and flat surface portion 50, for example.

Figure 5:
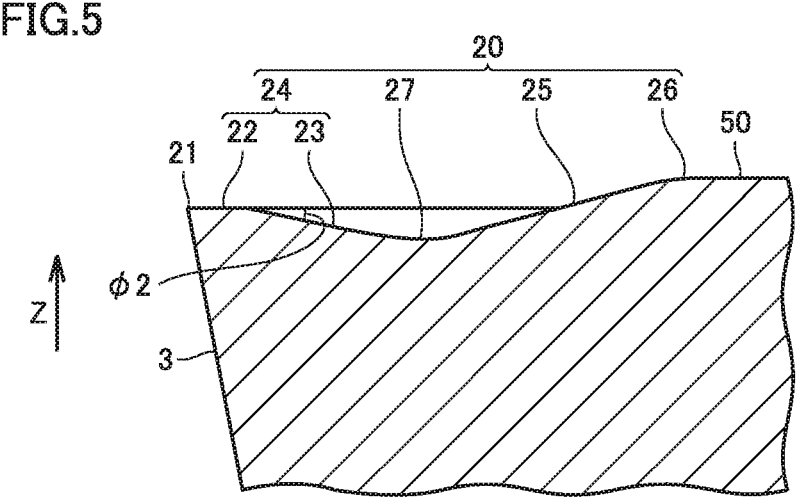
FIG. 5 is a schematic cross sectional view taken along a V-V line of FIG. 2.

FIG. 5 is a schematic cross sectional view taken along a V-V line of FIG. 2. As shown in FIG. 5, in the cross section perpendicular to second cutting edge portion 21 (second straight line L2), second inclined surface portion 23 and second side surface 25 may constitute second groove 20. Second inclined surface portion 23 is inclined toward the seating surface 2 side relative to second flat portion 22, for example. Second inclined surface portion 23 has a second rake angle $\phi2$ of more than or equal to 5° and less than or equal to 20°, for example, Second rake angle $\phi2$ may be an inclination angle of second inclined surface portion 23 relative to a plane parallel to seating surface 2. In second groove 20, a second bottom portion 27 is a portion having the lowest height in the direction perpendicular to seating surface 2. Second side surface 25 rises from second bottom portion 27 of second groove 20 toward flat surface portion 50. Second side surface 25 is inclined toward the seating surface 2 side relative to flat surface portion 50. In direction Z perpendicular to seating surface 2, second cutting edge portion 21 is located between second bottom portion 27 and flat surface portion 50, for example. Second rake angle $\phi2$ (see FIG. 5) of second inclined surface portion 23 in the cross section perpendicular to second straight line L2 is larger than first rake angle $\phi1$ (see FIG. 4) of first inclined surface portion 13 in the cross section perpendicular to first straight line L1.

Figure 6:
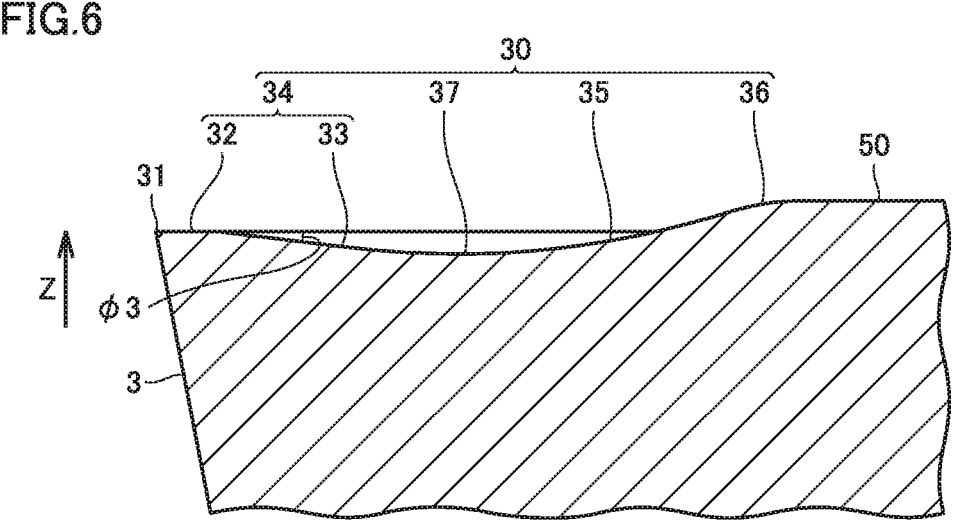
FIG. 6 is an enlarged view of a region VI of FIG. 3.

FIG. 6 is an enlarged view of a region VI of FIG. 3. As shown in FIG. 6, in the cross section perpendicular to third cutting edge portion 31 (fourth straight line L4), third inclined surface portion 33 and third side surface 35 may constitute third groove 30. Third inclined surface portion 33 is inclined toward the seating surface 2 side relative to third flat portion 32, for example. Third rake angle $\phi3$ of third inclined surface portion 33 may be the same as first rake angle $\phi1$ of first inclined surface portion 13. In third groove 30, a third bottom portion 37 is a portion having the lowest height in the direction perpendicular to seating surface 2. Third side surface 35 rises from third bottom portion 37 of third groove 30 toward flat surface portion 50. Third side surface 35 is inclined toward the seating surface 2 side relative to flat surface portion 50. In direction Z perpendicular to seating surface 2, third cutting edge portion 31 is located between third bottom portion 37 and flat surface portion 50, for example.

FIG. 7 is a schematic cross sectional view taken along a VII-VII line of FIG. 2. As shown in FIG. 7, in the cross section perpendicular to fourth cutting edge portion 41 (seventh straight line L7), fourth inclined surface portion 43 and fourth side surface 45 may constitute fourth groove 40. Fourth inclined surface portion 43 is inclined toward the seating surface 2 side relative to fourth flat portion 42, for example. Fourth rake angle $\phi4$ of fourth inclined surface portion 43 may be the same as second rake angle $\phi2$ of second inclined surface portion 23. In fourth groove 40, a fourth bottom portion 47 is a portion having the lowest height in the direction perpendicular to seating surface 2. Fourth side surface 45 rises from fourth bottom portion 47 of fourth groove 40 toward flat surface portion 50. Fourth side surface 45 is inclined toward the seating surface 2 side relative to flat surface portion 50. In direction Z perpendicular to seating surface 2, fourth cutting edge portion 41 is located between fourth bottom portion 47 and flat surface portion 50, for example.

FIG. 8 is a schematic cross sectional view taken along a line of FIG. 2. As shown in FIG. 8, in a cross section parallel to first cutting edge portion 11 (first straight line L1) and perpendicular to seating surface 2, first inclined surface portion 13 may be provided with a plurality of groove portions 18. As shown in FIG. 2, when seen in the direction perpendicular to seating surface 2, the plurality of groove portions 18 are disposed along the direction parallel to first straight line L1 with a space being interposed therebetween. Each of the plurality of groove portions 18 extends from first inclined surface portion 13 to first side surface 15. From a different point of view, it can be said that when seen in the direction perpendicular to seating surface 2, each of the plurality of groove portions 18 extends in the direction perpendicular to first straight line L1. Each of the plurality of groove portions 18 may have a portion in which the width thereof in the direction parallel to first straight line L1 becomes larger from the central portion toward first cutting edge portion 11. Similarly, each of the plurality of groove portions 18 may have a portion in which the width thereof in the direction parallel to first straight line L1 becomes larger from the central portion toward flat surface portion 50. The number of the plurality of groove portions 18 is not particularly limited, but is eight, for example. As shown in FIG. 2, a plurality of groove portions 38 having the same configurations as those of the plurality of groove portions 18 may be provided in third groove 30.

As shown in FIG. 2, for example, top surface 1 has: a first boundary line 16 that is a ridgeline between first side surface 15 and flat surface portion 50; a second boundary line 26 that is a ridgeline between second side surface 25 and flat surface portion 50; a third boundary line 36 that is a ridgeline between third side surface 35 and flat surface portion 50; and a fourth boundary line 46 that is a ridgeline between fourth side surface 45 and flat surface portion 50. When seen in the direction perpendicular to seating surface 2, second boundary line 26 has a first portion 61, a second portion 62, a third portion 63, and a fourth portion 64, for example. First portion 61 is located between first boundary line 16 and an intersection B between second boundary line 26 and a third straight line L3 passing through center A of mounting hole 4 and perpendicular to second cutting edge portion 21. First portion 61 extends from intersection B toward first cutting edge portion 11, for example. Second portion 62 is located opposite to first portion 61 relative to intersection B. From a different point of view, it can be said that second portion 62 is located between intersection B and third boundary line 36. Second portion 62 extends from intersection B toward third cutting edge portion 31, for example.

Figure 9:
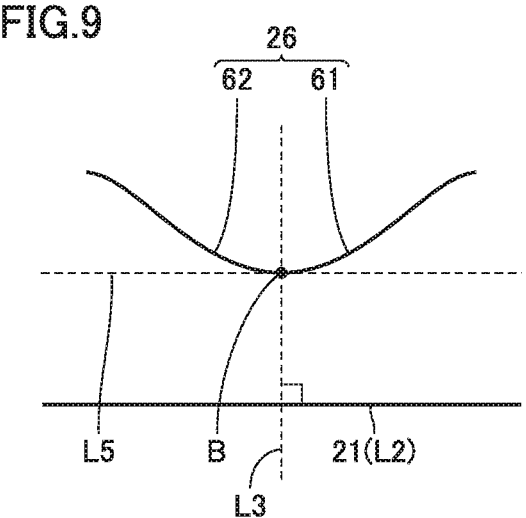
FIG. 9 is a schematic plan view for illustrating a first example of a first portion and a second portion.
Figure 10:
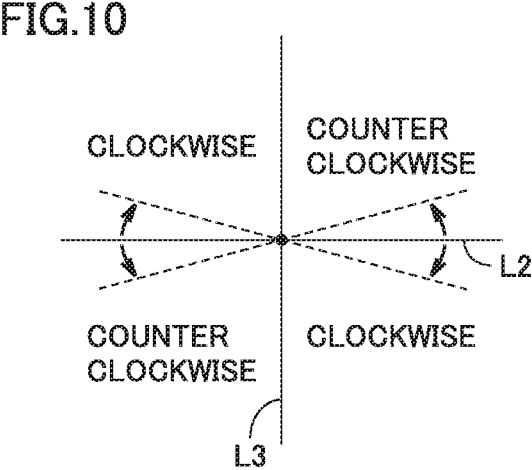
FIG. 10 is a diagram for illustrating definitions of the terms "clockwise" and "counter clockwise".

FIG. 9 is a schematic plan view for illustrating a first example of the first portion and the second portion. FIG. 10 is a diagram for illustrating definitions of the terms "clockwise" and "counter clockwise". As shown in FIG. 9, when seen in the direction perpendicular to seating surface 2, first portion 61 has an inclination relative to second cutting edge portion 21 (second straight line L2) in the counter clockwise direction (see FIG. 10), From a different point of view, it can be said that a tangent of first portion 61 is a straight line that is rotated counter clockwise at an angle of less than 90° relative to a fifth straight line L5 parallel to second cutting edge portion 21 (second straight line L2) and passing through intersection B. First portion 61 may have a straight line shape and/or may have a curve line shape. When seen in the direction perpendicular to seating surface 2, second portion 62 has an inclination relative to second cutting edge portion 21 (second straight line L2) in the clockwise direction (see FIG. 10), From a different point of view, it can be said that a tangent of second portion 62 is a straight line that is rotated clockwise at an angle of less than 90° relative to fifth straight line L5 parallel to second cutting edge portion 21 (second straight line L2) and passing through intersection B. Second portion 62 may have a straight line shape and/or may have a curve line shape. When seen in the direction perpendicular to seating surface 2, second boundary line 26 may have a portion extending along a concentric circle of mounting hole 4. First portion 61 may extend along the concentric circle of mounting hole 4. Similarly, second portion 62 may extend along the concentric circle of mounting hole 4. It should be noted that as shown in FIG. 10, the term "clockwise" or "counterclockwise" refers to a direction of rotation at an angle of less than 90° relative to fifth straight line L5 passing through intersection B between first portion 61 and second portion 62 and parallel to second straight line L2.

Figure 11:
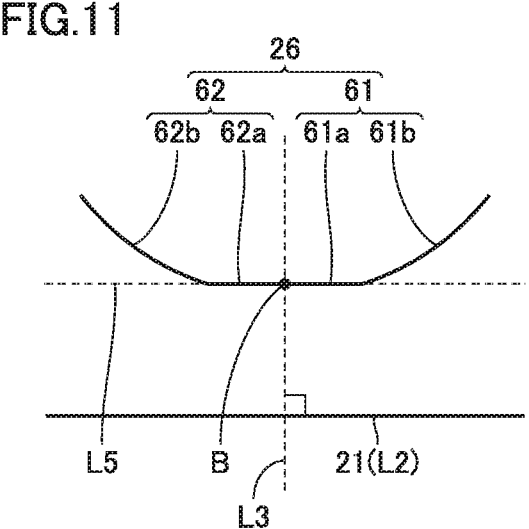
FIG. 11 is a schematic plan view for illustrating a second example of the first portion and the second portion.

FIG. 11 is a schematic plan view for illustrating a second example of the first portion and the second portion. As shown in FIG. 11, first portion 61 may have a first line segment 61a and a first curvature portion 61b. First line segment 61a extends from intersection B along fifth straight line L5. First curvature portion 61b is continuous to first line segment 61a. First curvature portion 61h has an inclination relative to second cutting edge portion 21 (second straight line L2) in the counter clockwise direction. Second portion 62 may have a second line segment 62a and a second curvature portion 62b. Second line segment 62a extends from intersection B along second straight line L2. Second curvature portion 62b is continuous to second line segment 62a. Second curvature portion 62b has an inclination relative to second cutting edge portion 21 (second straight line L2) in the clockwise direction.

As shown in FIG. 2, third portion 63 is continuous to second portion 62 between second portion 62 and third boundary line 36, Third portion 63 is located between second portion 62 and third cutting edge portion 31. When seen in the direction perpendicular to seating surface 2, third portion 63 has an inclination relative to second cutting edge portion 21 (second straight line L2) in the counter clockwise direction (see FIG. 10), From a different point of view, it can be said that the tangent of third portion 63 is a straight line that is rotated counter clockwise at an angle of less than 90° relative to second cutting edge portion 21 (second straight line L2). Third portion 63 may have a straight line shape and/or may have a curve line shape. Fourth portion 64 is continuous to first portion 61 between first portion 61 and first boundary line 16. Fourth portion 64 is located between first portion 61 and first cutting edge portion 11. When seen in the direction perpendicular to seating surface 2, fourth portion 64 has an inclination relative to second cutting edge portion 21 (second straight line L2) in the clockwise direction (see FIG. 10). From a different point of view, it can be said that the tangent of fourth portion 64 is a straight line that is rotated clockwise at an angle of less than 90° relative to second cutting edge portion 21 (second straight line L2). Third portion 63 may have a straight line shape and/or may have a curve line shape.

As shown in FIG. 2, second boundary line 26 is continuous to third boundary line 36 at a connection portion C. Specifically, third portion 63 of second boundary line 26 is continuous to third boundary line 36 at connection portion C. When seen in the direction perpendicular to seating surface 2, connection portion C between third boundary line 36 and third portion 63 is located between third cutting edge portion 31 and a bisector L6 of angle θ2 between second cutting edge portion 21 (second straight line L2) and third cutting edge portion 31 (fourth straight line L4). From a different point of view, it can be said that connection portion C is located on the third cutting edge portion 31 side relative to bisector L6 of the angle between second straight line L2 and fourth straight line L4. When seen in the direction perpendicular to seating surface 2, a distance D2 between connection portion C and second cutting edge portion 21 may be longer than a distance D1 between intersection B and second cutting edge portion 21 in the direction parallel to third straight line L3.

As shown in FIG. 2, fourth boundary line 46 may have a shape point-symmetrical to second boundary line 26. When seen in the direction perpendicular to seating surface 2, each of second boundary line 26 and fourth boundary line 46 may have an M shape, for example. Each of first boundary line 16 and third boundary line 36 has a straight line shape, for example. First boundary line 16 is parallel to third boundary line 36, for example. First boundary line 16 may be parallel to first cutting edge portion 11 (first straight line L1). Third boundary line 36 may be parallel to third cutting edge portion 31 (fourth straight line L4).

It should be noted that in the description above, it has been illustrated that first rake face 14 has first flat portion 12 and first inclined surface portion 13; however, first rake face 14 may have no first flat portion 12 and may be directly continuous to first cutting edge portion 11. Similarly, second rake face 24 may have no second flat portion 22 and may be directly continuous to second cutting edge portion 21. Third rake face 34 may have no third flat portion 32, and may be directly continuous to third cutting edge portion 31. Fourth rake face 44 may have no fourth flat portion 42, and may be directly continuous to fourth cutting edge portion 41.

The following describes function and effect of cutting insert 100 for drill according to the first embodiment.

According to cutting insert 100 for drill according to the first embodiment, second boundary line 26 has first portion 61 having an inclination relative to second cutting edge portion 21 in the counter clockwise direction. This results in a longer distance until swarf cut by second cutting edge portion 21 hits second boundary line 26, as compared with a case where second boundary line 26 extends in parallel with second cutting edge portion 21. Even when second cutting edge portion 21 is used for the inner circumference side of the drill on which cutting speed is relatively slow; second side surface 25 does not prevent swarf from flowing out therefrom. Accordingly, the swarf can be suppressed from being brought into abutment with a side wall surface of a hole formed in a workpiece to form a scratch on the side wall surface. Hence, quality of the side wall surface of the hole can be suppressed from being deteriorated.

Moreover, according to cutting insert 100 for drill according to the first embodiment, second boundary line 26 may have second portion 62 located opposite to first portion 61 relative to intersection B. When seen in the direction perpendicular to seating surface 2, second portion 62 may have an inclination relative to second cutting edge portion 21 in the clockwise direction. Accordingly, quality of the side wall surface of the hole can be further suppressed from being deteriorated.

According to cutting insert 100 for drill according to the first embodiment, top surface 1 may be provided with: third rake face 34 continuous to third cutting edge portion 31; third side surface 35 continuous to both third rake face 34 and flat surface portion 50; third groove 30 constituted of third rake face 34 and third side surface 35; and third boundary line 36 that is a ridgeline between third side surface 35 and flat surface portion 50 and that has a straight line shape. Second boundary line 26 may have third portion 63 continuous to second portion 62 between intersection B and third boundary line 36. When seen in the direction perpendicular to seating surface 2, third portion 63 may have an inclination relative to second cutting edge portion 21 in the counter clockwise direction. With such a third portion 63, the length of third boundary line 36 can be long. When such a third cutting edge portion 31 is used as a cutting edge on the outer circumferential side of the drill on which relative cutting speed is high, swarf can be rounded effectively. Accordingly, quality of the side wall surface of the hole can be further suppressed from being deteriorated.

According to cutting insert 100 for drill according to the first embodiment, second boundary line 26 may have a fourth portion 64 continuous to first portion 61 between intersection B and first boundary line 16. When seen in the direction perpendicular to seating surface 2, fourth portion 64 may have an inclination relative to second cutting edge portion 21 in the clockwise direction. Accordingly, quality of the side wall surface of the hole can be further suppressed from being deteriorated:

Second Embodiment

The following describes a configuration of a cutting insert 100 for drill according to a second embodiment. It should be noted that in the description below, configurations different from those of cutting insert 100 for drill according to the first embodiment will be mainly described, and the same explanation will not be described repeatedly.

Figure 12:
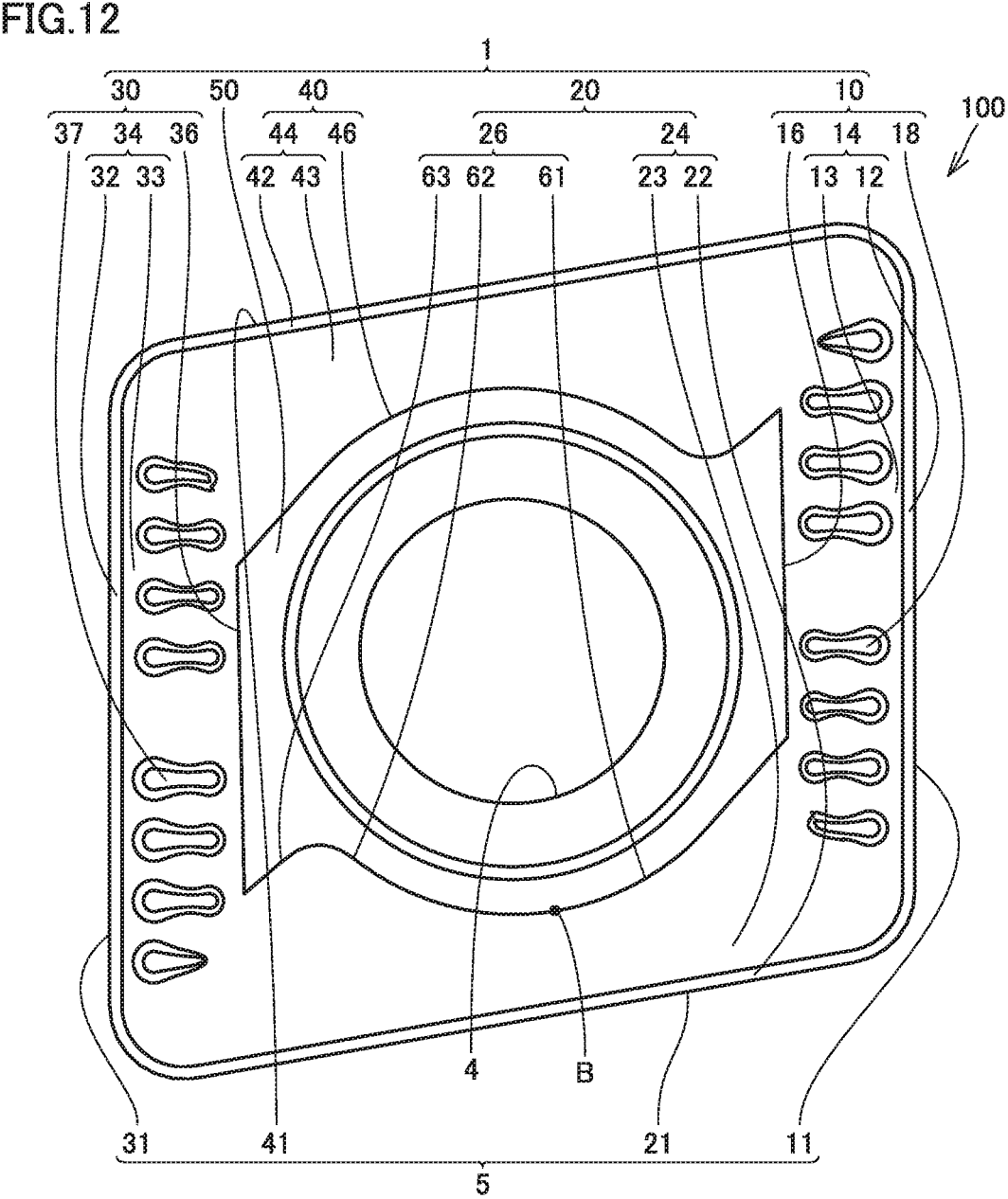
FIG. 12 is a schematic plan view showing a configuration of a cutting insert for drill according to a second embodiment.

FIG. 12 is a schematic plan view showing the configuration of the cutting insert for drill according to the second embodiment. As shown in FIG. 12, second boundary line 26 may be constituted of first portion 61, second portion 62, and third portion 63. From a different point of view, it can be said that second boundary line 26 may not include fourth portion 64. First portion 61 extends from intersection B toward first cutting edge portion 11 and is continuous to first boundary line 16. First portion 61 may have a straight line shape and/or may have a curve line shape. Cutting insert 100 for drill according to the second embodiment also exhibits the same effect as that of cutting insert 100 for drill according to the first embodiment.

Third Embodiment

The following describes a configuration of a cutting insert 100 for drill according to a third embodiment. It should be noted that in the description below, configurations different from those of cutting insert 100 for drill according to the first embodiment will be mainly described, and the same explanation will not be described repeatedly.

Figure 13:
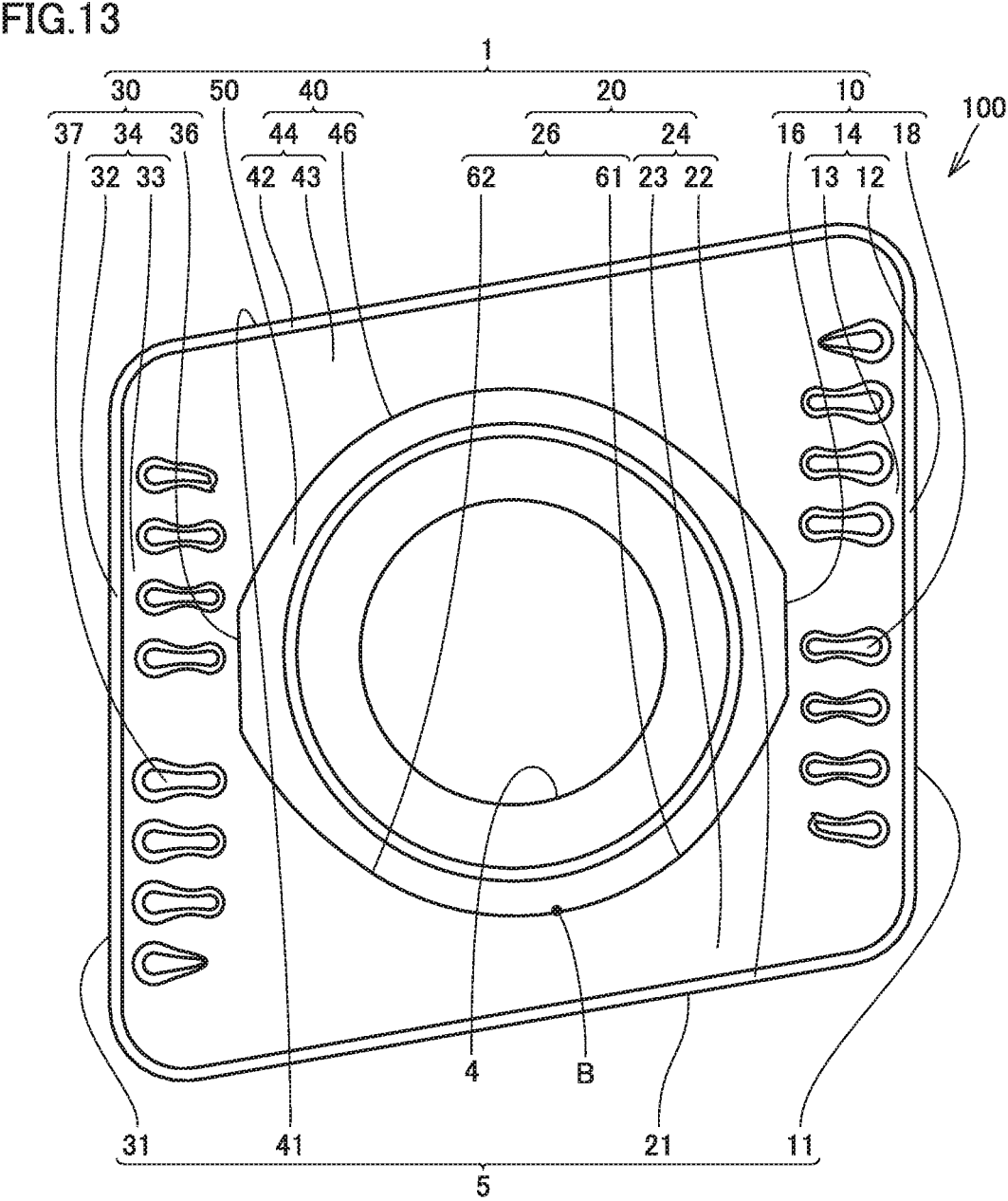
FIG. 13 is a schematic plan view showing a configuration of a cutting insert for drill according to a third embodiment.

FIG. 13 is a schematic plan view showing the configuration of the cutting insert for drill according to the third embodiment. As shown in FIG. 13, second boundary line 26 may be constituted of first portion 61 and second portion 62. From a different point of view, it can be said that second boundary line 26 may not have third portion 63 and fourth portion 64. First portion 61 extends from intersection B toward first cutting edge portion 11, and is continuous to first boundary line 16. First portion 61 may have a straight line shape and/or may have a curve line shape. Second portion 62 extends from intersection B toward third cutting edge portion 31 and is continuous to third boundary line 36. Second portion 62 may have a straight line shape and/or may have a curve line shape. Cutting insert 100 for drill according to the third embodiment also exhibits the same effect as that of cutting insert 100 for drill according to the first embodiment.

Fourth Embodiment

The following describes a configuration of a drill according to a fourth embodiment.

Figure 14:
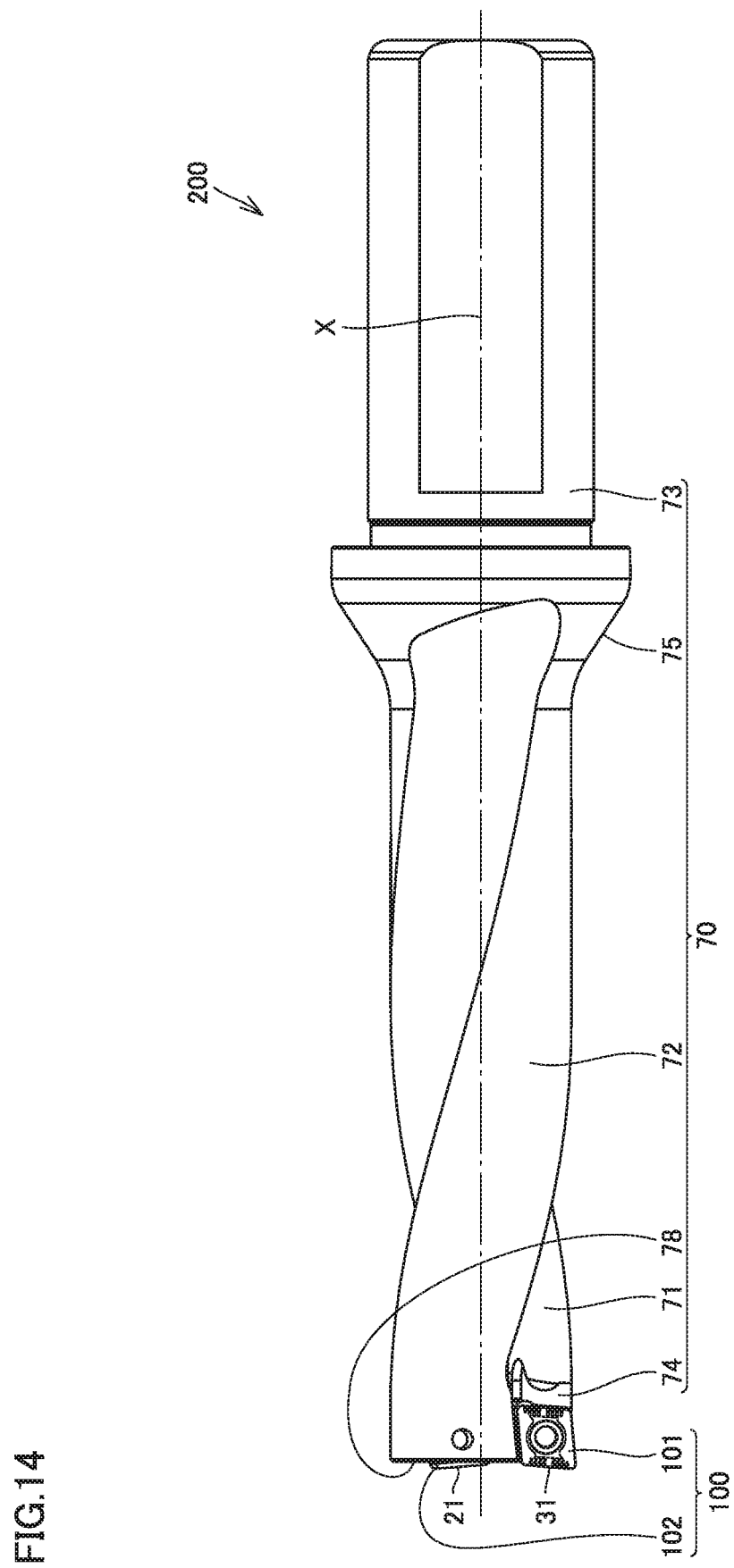
FIG. 14 is a schematic plan view showing a configuration of a drill according to a fourth embodiment.
Figure 15:
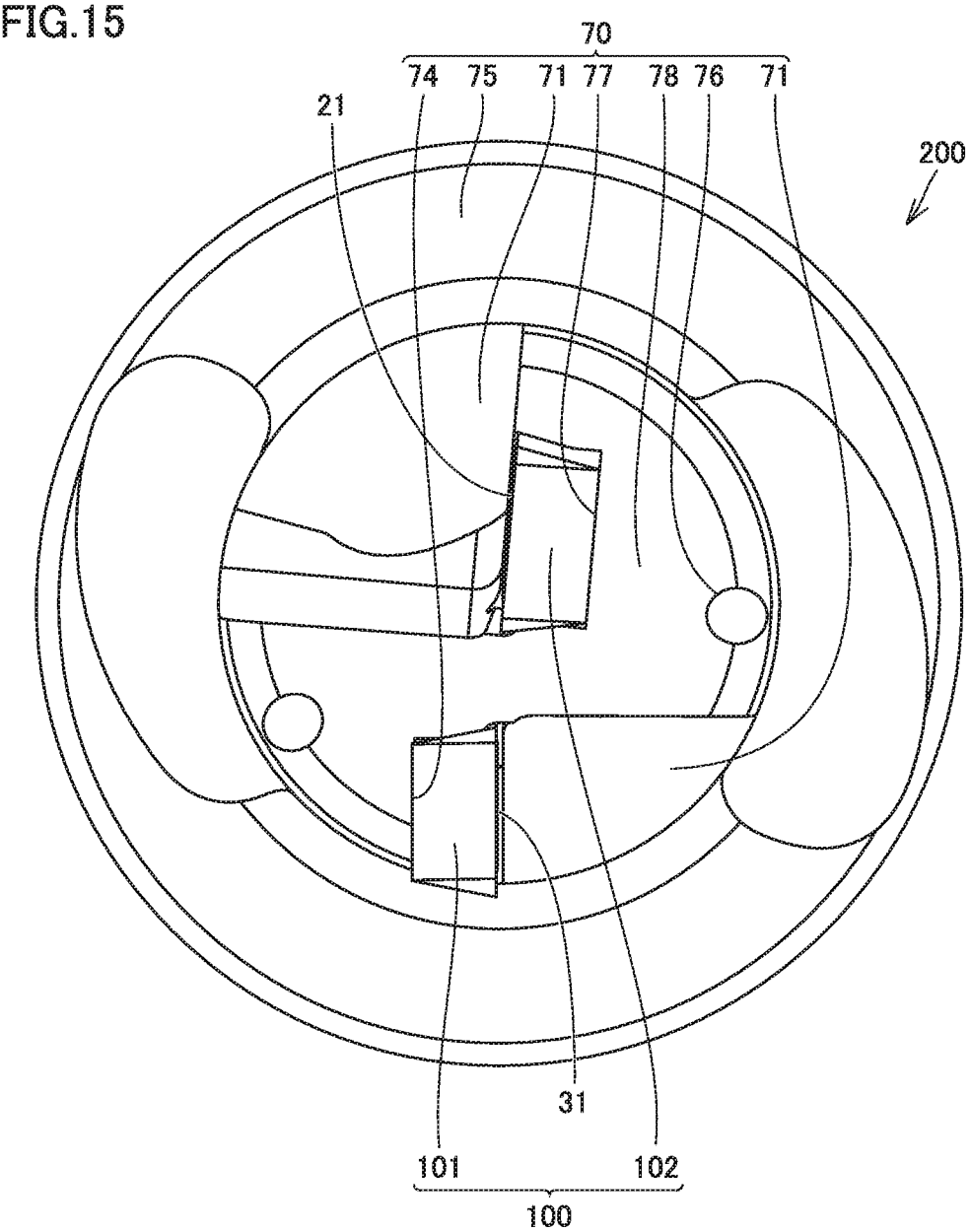
FIG. 15 is a schematic side view showing the configuration of the drill according to the fourth embodiment.

FIG. 14 is a schematic plan view showing the configuration of the drill according to the fourth embodiment. As shown in FIG. 14, a drill 200 according to the fourth embodiment is an indexable drill, and mainly has cutting insert 100 for drill and a holder 70. Drill 200 is rotatable around a rotation axis X. Holder 70 supports cutting insert 100 for drill. As shown in FIG. 14 and FIG. 15, holder 70 mainly has a front end surface 78, a flute portion 71, an outer side surface 72, an extension portion 75, an inner side mounting groove 77, an outer side mounting groove 74, and a shank portion 73. Flute portion 71 extends from each of inner side mounting groove 77 and outer side mounting groove 74 toward extension portion 75. Flute portion 71 helically extends around rotation axis X, Outer side surface 72 extends from front end surface 78 toward expansion portion 75. Expansion portion 75 is a portion in which the width of the drill in the radial direction is large in a direction from front end surface 78 toward shank portion 73. Expansion portion 75 is located between flute portion 71 and shank portion 73. Shank portion 73 is continuous to expansion portion 75.

FIG. 15 is a schematic side view showing the configuration of the drill according to the fourth embodiment. As shown in FIG. 15, cutting insert 100 for drill is attached to holder 70. Specifically, a first cutting insert 101 is disposed in outer side mounting groove 74, A second cutting insert 102 is disposed in inner side mounting groove 77. Each of first cutting insert 101 and second cutting insert 102 is attached to holder 70 by a fastening portion (not shown), for example. The fastening portion is disposed in mounting hole 4. A coolant feed hole 76 may be provided in front end surface 78. Coolant feed hole 76 opens in front end surface 78.

As shown in FIG. 14, first cutting insert 101 is disposed such that third cutting edge portion 31 is located on the front side relative to front end surface 78 of holder 70. Second cutting insert 102 is disposed such that second cutting edge portion 21 is located on the front side relative to front end surface 78 of holder 70. The central portion of the hole can be dug out by second cutting edge portion 21. The surroundings of the central portion can be dug out by third cutting edge portion 31. That is, third cutting edge portion 31 is an outer edge and second cutting edge portion 21 is an inner edge.

Figure 16:
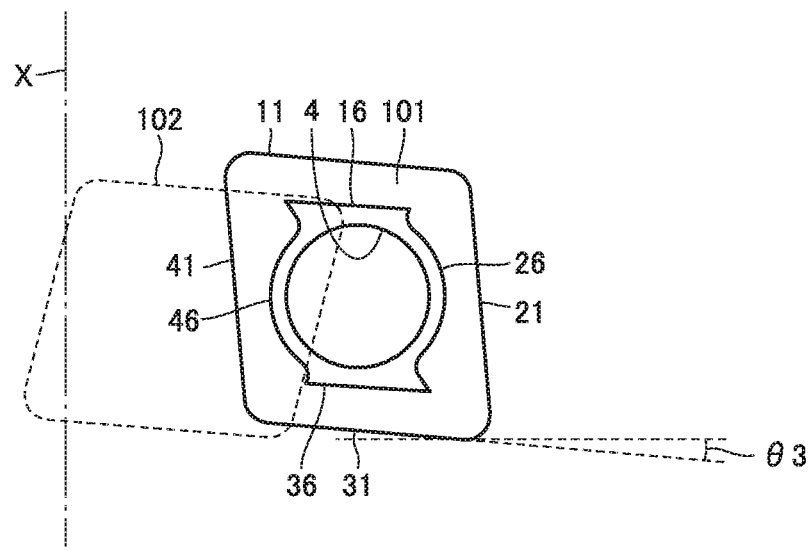
FIG. 16 is a first diagram for illustrating a positional relation between an inner edge and an outer edge.
Figure 17:
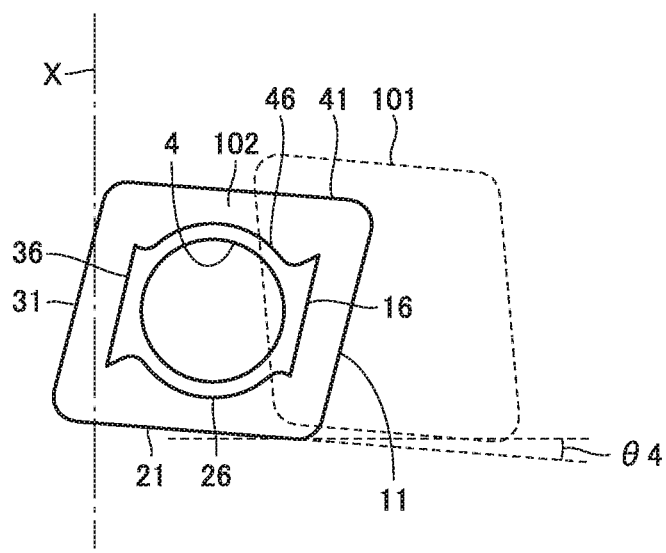
FIG. 17 is a second diagram for illustrating a positional relation between the inner edge and the outer edge.

Each of FIG. 16 and FIG. 17 is a diagram for illustrating a positional relation between the inner edge and the outer edge. In FIG. 16, first cutting insert 101 is indicated by a solid line, and second cutting insert 102 is indicated by a broken line. In FIG. 17, first cutting insert 101 is indicated by a broken line, and second cutting insert 102 is indicated by a solid line.

As shown in FIG. 16 and FIG. 17, each of first cutting insert 101 and second cutting insert 102 is disposed such that a portion of first cutting insert 101 overlaps with a trajectory of second cutting insert 102 when the drill is rotated. As shown in FIG. 16, first cutting edge portion 11 is inclined by an angle θ3 relative to a straight line perpendicular to rotation axis X. Angle θ3 is more than or equal to 0° and less than or equal to 15°, for example. As shown in FIG. 17, second cutting edge portion 21 is inclined by an angle θ4 relative to the straight line perpendicular to rotation axis X. Angle θ4 is more than or equal to 5° and less than or equal to 20°, for example. As described above, first cutting insert 101 and second cutting insert 102 are attached to holder 70.

Since second cutting edge portion 21 is an inner edge with a slow cutting speed, flow of swarf is slow. Since second boundary line 26 has an inclination relative to second cutting edge portion 21 in the drill according to the fourth embodiment, a distance from second cutting edge portion 21 to second boundary line 26 is large. Hence, the flow of swarf is not prevented and the outflow direction of swarf can be controlled, thereby improving a discharge characteristic. Third cutting edge portion 31, which is an outer edge, attains a higher cutting speed than that of the inner edge. Since third boundary line 36 has a straight line shape, swarf is divided appropriately, thereby improving the swarf discharge characteristic.

Examples (Preparation of Samples)

First, cutting inserts 100 according to samples 1 and 2 were prepared. Sample 1 was represented by cutting insert 100 (see FIG. 1) for drill according to the first embodiment. Specifically, in sample 1, when seen in the direction perpendicular to seating surface 2, second boundary line 26 has an M shape. That is, second boundary line 26 had first portion 61, second portion 62, third portion 63, and fourth portion 64. On the other hand, sample 2 was represented by cutting insert 100 for drill according to a comparative example. Specifically, in sample 2, when seen in the direction perpendicular to seating surface 2, the second boundary line has a straight line shape. The second boundary line extends in the direction parallel to the extending direction of the second cutting edge portion.

(Evaluation Method)

A drilling process was performed using cutting insert 100 for drill according to each of samples 1 and 2, As a workpiece, SUS316L was employed. The diameter of the drill was set to 20 mm. A cutting speed (Vc) was set to 150 m/minute. A feed rate (f) was set to 0.08 mm/rotation. The depth (H) of the hole was set to 40 mm. A heavy-low processing sound during the drilling process and quality of the side wall surface of the hole were evaluated. The processing sound was determined based on the following criteria. An evaluation A indicates such a degree of sound volume of heavy-low sound that the heavy-low sound cannot be heard normally by a worker just beside the processing machine. An evaluation B indicates such a degree of sound volume of heavy-low sound that the heavy-low sound can be heard normally by a worker just beside the processing machine. The quality of the side wall surface of the hole was determined based on the following criteria. An evaluation A indicates a case where no scratch line extending in the circumferential direction is formed on the side wall surface of the hole and the wall surface is not scratched. An evaluation B indicates a case where one or two scratch lines extending in the circumferential direction are formed on the side wall surface of the hole. An evaluation C indicates a case where three or more scratch lines extending in the circumferential direction are formed on the side wall surface of the hole and an apparent level difference is formed on the side wall surface.

(Evaluation Result)

TABLE 1

| Sample Number | Heavy-Low Processing Sound | Quality of Side Wall Surface of Hole |
| --- | --- | --- |
| Sample 1 | Evaluation A | Evaluation A |
| Sample 2 | Evaluation B | Evaluation C |

As shown in Table 1, regarding the heavy-low processing sound during the drilling process, samples 1 and 2 had evaluation A and evaluation B, respectively. The sound volume of the heavy-low sound during the drilling process using cutting insert 100 for drill according to sample 1 was smaller than the sound volume of the heavy-low sound during the drilling process using cutting insert 100 for drill according to sample 2. Regarding the quality of the side wall surface of the hole, samples 1 and 2 had evaluation A and evaluation C, respectively. The quality of the side wall surface of the hole formed using cutting insert 100 for drill according to sample 1 was more excellent than the quality of the side wall surface of the hole formed using cutting insert 100 for drill according to sample 2.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: top surface; 2: seating surface; 3: outer circumferential surface; 4: mounting hole; 4a: first hole portion; 4b: second hole portion; 5: cutting edge; 10: first groove; 11: first cutting edge portion; 12: first flat portion; 13: first inclined surface portion; 14: first rake face; 15: first side surface; 16: first boundary line; 17: first bottom portion; 18: groove portion; 20: second groove; 21: second cutting edge portion; 22: second flat portion; 23: second inclined surface portion; 24: second rake face; 25: second side surface; 26: boundary line; 26: second boundary line; 27: second bottom portion; 30: third groove; 31: third cutting edge portion; 32: third flat portion; 33: third inclined surface portion; 34: third rake face; 35: third side surface; 36: third boundary line; 37: third bottom portion; 40: fourth groove; 41: fourth cutting edge portion; 42: fourth flat portion; 43: fourth inclined surface portion; 44: fourth rake face; 45: fourth side surface; 46: fourth boundary line; 47: fourth bottom portion; 50: flat surface portion; 61: first portion; 61a: first line segment; 61b: first curvature portion; 62: second portion; 62a: second line segment; 62b: second curvature portion; 63: third portion; 64: fourth portion; 70: holder; 71: flute portion; 72: outer side surface; 73: shank portion; 74: outer side mounting groove; 75: expansion portion; 76: coolant feed hole; 77: inner side mounting groove; 78: front end surface; 81: first corner edge portion; 82: second corner edge portion; 83: third corner edge portion; 84: fourth corner edge portion; 100: cutting insert for drill; 101: first cutting insert; 102: second cutting insert; 200: drill; A: center; B: intersection; C: connection portion; D1, D2: distance; IV, VI: region; L1: first straight line; L2: second straight line; L3: third straight line; L4: fourth straight line; L5: fifth straight line; L6: bisector; L7: seventh straight line; W1 W2: length; X: rotation axis; Z: direction.

The invention claimed is:

1. A cutting insert for a drill, the cutting insert comprising:
a top surface;
a seating surface located opposite to the top surface; and
an outer circumferential surface continuous to each of the top surface and the seating surface, wherein
the cutting insert is provided with a mounting hole extending from the top surface to the seating surface,
a ridgeline between the top surface and the outer circumferential surface constitutes a cutting edge,
when seen in a direction perpendicular to the seating surface, the cutting edge has a parallelogram shape having a first cutting edge portion, a second cutting edge portion, a third cutting edge portion, and a fourth cutting edge portion,
the first cutting edge portion faces the third cutting edge portion and an angle between the third cutting edge portion and the second cutting edge portion is smaller than 90°,
the second cutting edge portion faces the fourth cutting edge portion and a length of the second cutting edge portion is larger than a length of the first cutting edge portion, the top surface is provided with
a first rake face continuous to the first cutting edge portion,
a first side surface continuous to the first rake face,
a second rake face continuous to the second cutting edge portion,
a second side surface continuous to the second rake face,
a flat surface portion continuous to both the first side surface and the second side surface,
a first groove constituted of the first rake face and the first side surface,
a second groove constituted of the second rake face and the second side surface,
a first boundary line that is a ridgeline between the first side surface and the flat surface portion and that has a straight line shape, and
a second boundary line that is a ridgeline between the second side surface and the flat surface portion, and
when seen in the direction perpendicular to the seating surface, the second boundary line has a first portion and a second portion, the first portion having an inclination relative to the second cutting edge portion in a counter clockwise direction, the first portion being located between the first boundary line and an intersection between the second boundary line and a straight line passing through a center of the mounting hole and perpendicular to the second cutting edge portion, the second portion being located opposite to the first portion relative to the intersection, the second portion having an inclination relative to the second cutting edge portion in a clockwise direction,
wherein
the top surface is provided with
a third rake face continuous to the third cutting edge portion,
a third side surface continuous to both the third rake face and the flat surface portion,
a third groove constituted of the third rake face and the third side surface, and
a third boundary line that is a ridgeline between the third side surface and the flat surface portion and that has a straight line shape,
the second boundary line has a third portion continuous to the second portion between the second portion and the third boundary line,
when seen in the direction perpendicular to the seating surface, the third portion has an inclination relative to the second cutting edge portion in the counter clockwise direction, and
when seen in the direction perpendicular to the seating surface, a connection portion between the third portion and the third boundary line is located between the third cutting edge portion and a bisector of the angle between the second cutting edge portion and the third cutting edge portion.

2. The cutting insert for a drill according to claim 1, wherein when seen in the direction perpendicular to the seating surface, a distance between the connection portion and the second cutting edge portion is longer than a distance between the intersection and the second cutting edge portion in a direction parallel to the straight line.

3. The cutting insert for a drill according to claim 1, wherein
the second boundary line has a fourth portion continuous to the first portion between the first portion and the first boundary line, and when seen in the direction perpendicular to the seating surface, the fourth portion has an inclination relative to the second cutting edge portion in the clockwise direction.

4. The cutting insert for a drill according to claim 1, wherein a rake angle of the second rake face in a cross section perpendicular to the second cutting edge portion is larger than a rake angle of the first rake face in a cross section perpendicular to the first cutting edge portion.

5. The cutting insert for a drill according to claim 1, wherein
the first rake face has a first flat portion continuous to the first cutting edge portion, and a first inclined surface portion continuous to the first flat portion, and
the first inclined surface portion is provided with a plurality of groove portions disposed along a direction parallel to the first cutting edge portion with a space being interposed between the plurality of groove portions.

6. A drill comprising:
the cutting insert for drill according to claim 1; and
a holder that supports the cutting insert for drill, wherein
the first cutting edge portion is an outer edge and the second cutting edge portion is an inner edge.

7. A cutting insert for a drill, the cutting insert comprising:
a top surface;
a seating surface located opposite to the top surface; and
an outer circumferential surface continuous to each of the top surface and the seating surface, wherein
the cutting insert is provided with a mounting hole extending from the top surface to the seating surface,
a ridgeline between the top surface and the outer circumferential surface constitutes a cutting edge,
when seen in a direction perpendicular to the seating surface, the cutting edge has a parallelogram shape having a first cutting edge portion, a second cutting edge portion, a third cutting edge portion, and a fourth cutting edge portion,
the first cutting edge portion faces the third cutting edge portion and an angle between the third cutting edge portion and the second cutting edge portion is smaller than 90°,
the second cutting edge portion faces the fourth cutting edge portion and a length of the second cutting edge portion is larger than a length of the first cutting edge portion,
the top surface is provided with
a first rake face continuous to the first cutting edge portion,
a first side surface continuous to the first rake face,
a second rake face continuous to the second cutting edge portion,
a second side surface continuous to the second rake face,
a third rake face continuous to the third cutting edge portion,
a third side surface continuous to the third rake face,
a flat surface portion continuous to the first side surface, the second side surface, and the third side surface,
a first groove constituted of the first rake face and the first side surface,
a second groove constituted of the second rake face and the second side surface,
a third groove constituted of the third rake face and the third side surface,
a first boundary line that is a ridgeline between the first side surface and the flat surface portion and that has a straight line shape,
a second boundary line that is a ridgeline between the second side surface and the flat surface portion, and
a third boundary line that is a ridgeline between the third side surface and the flat surface portion and that has a straight line shape,
when seen in the direction perpendicular to the seating surface, the second boundary line has a first portion, a second portion, a third portion, and a fourth portion,
the first portion is located between the first boundary line and an intersection between the second boundary line and a straight line passing through a center of the mounting hole and perpendicular to the second cutting edge portion,
the second portion is located opposite to the first portion relative to the intersection,
the third portion is continuous to the second portion between the second portion and the third boundary line,
the fourth portion is continuous to the first portion between the first portion and the first boundary line, and
when seen in the direction perpendicular to the seating surface, each of the first portion and the third portion has an inclination relative to the second cutting edge portion in a counter clockwise direction,
when seen in the direction perpendicular to the seating surface, each of the second portion and the fourth portion has an inclination relative to the second cutting edge portion in a clockwise direction,
when seen in the direction perpendicular to the seating surface, a connection portion between the third boundary line and the third portion is located between the third cutting edge portion and a bisector of the angle between the second cutting edge portion and the third cutting edge portion,
when seen in the direction perpendicular to the seating surface, a distance between the connection portion and the second cutting edge portion is longer than a distance between the intersection and the second cutting edge portion in a direction parallel to the straight line,
a rake angle of the second rake face in a cross section perpendicular to the second cutting edge portion is larger than a rake angle of the first rake face in a cross section perpendicular to the first cutting edge portion,
when seen in the direction perpendicular to the seating surface, the second boundary line has a portion extending along a concentric circle of the mounting hole,
the first boundary line is parallel to the first cutting edge portion, and
each of the third portion and the fourth portion has a straight line shape.

8. A cutting insert for a drill, the cutting insert comprising:
a top surface;
a seating surface located opposite to the top surface; and
an outer circumferential surface continuous to each of the top surface and the seating surface, wherein
the cutting insert is provided with a mounting hole extending from the top surface to the seating surface,
a ridgeline between the top surface and the outer circumferential surface constitutes a cutting edge,
when seen in a direction perpendicular to the seating surface, the cutting edge has a parallelogram shape having a first cutting edge portion, a second cutting edge portion, a third cutting edge portion, and a fourth cutting edge portion, the first cutting edge portion faces the third cutting edge portion and an angle between the third cutting edge portion and the second cutting edge portion is smaller than 90°, the second cutting edge portion faces the fourth cutting edge portion and a length of the second cutting edge portion is larger than a length of the first cutting edge portion, the top surface is provided with a first rake face continuous to the first cutting edge portion, a first side surface continuous to the first rake face, a second rake face continuous to the second cutting edge portion, a second side surface continuous to the second rake face, a flat surface portion continuous to both the first side surface and the second side surface, a first groove constituted of the first rake face and the first side surface, a second groove constituted of the second rake face and the second side surface, a first boundary line that is a ridgeline between the first side surface and the flat surface portion and that has a straight line shape, and a second boundary line that is a ridgeline between the second side surface and the flat surface portion, and when seen in the direction perpendicular to the seating surface, the second boundary line has a first portion and a second portion, the first portion having an inclination relative to the second cutting edge portion in a counter clockwise direction, the first portion being located between the first boundary line and an intersection between the second boundary line and a straight line passing through a center of the mounting hole and perpendicular to the second cutting edge portion, the second portion being located opposite to the first portion relative to the intersection, the second portion having an inclination relative to the second cutting edge portion in a clockwise direction, wherein a rake angle of the second rake face in a cross section perpendicular to the second cutting edge portion is larger than a rake angle of the first rake face in a cross section perpendicular to the first cutting edge portion.

\* \* \* \* \*